(12) United States Patent
Cho et al.

(10) Patent No.: US 9,936,190 B2
(45) Date of Patent: Apr. 3, 2018

(54) OPTICAL MODULATION DEVICE INCLUDING LIQUID CRYSTALS, A DRIVING METHOD THEREOF, AND AN OPTICAL DISPLAY DEVICE USING THE SAME

(71) Applicant: SAMSUNG DISPLAY CO., LTD., Yongin, Gyeonggi-Do (KR)

(72) Inventors: Jung-Hyun Cho, Seoul (KR); Seung Jun Jeong, Hwaseong-si (KR); Seong Min Cho, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 271 days.

(21) Appl. No.: 14/737,835

(22) Filed: Jun. 12, 2015

(65) Prior Publication Data
US 2016/0203785 A1    Jul. 14, 2016

(30) Foreign Application Priority Data

Jan. 12, 2015 (KR) .......................... 10-2015-0004342

(51) Int. Cl.
| | |
|---|---|
| *H04N 13/04* | (2006.01) |
| *G02F 1/136* | (2006.01) |
| *G02F 1/1337* | (2006.01) |
| *G02F 1/1343* | (2006.01) |

(Continued)

(52) U.S. Cl.
CPC ........... *H04N 13/04* (2013.01); *G02B 27/225* (2013.01); *G02F 1/1337* (2013.01); *G02F 1/134336* (2013.01); *G02F 1/29* (2013.01); *H04N 13/0404* (2013.01); *G02F 2001/294* (2013.01)

(58) Field of Classification Search
CPC .............................. H04N 13/04; G02F 1/1368
See application file for complete search history.

(56) References Cited

U.S. PATENT DOCUMENTS

| | | | | |
|---|---|---|---|---|
| 5,815,230 | A | * 9/1998 | Miura | ............... G02F 1/133753 349/129 |
| 8,531,646 | B2 | 9/2013 | Shi et al. | |

(Continued)

FOREIGN PATENT DOCUMENTS

| | | |
|---|---|---|
| KR | 1020060124849 | 12/2006 |
| KR | 1020090004006 | 1/2009 |

*Primary Examiner* — Kent Chang
*Assistant Examiner* — Scott Au
(74) *Attorney, Agent, or Firm* — F. Chau & Associates, LCC

(57) ABSTRACT

An optical modulation device is provided. The optical modulation device includes first and second plates facing each other, a liquid crystal layer interposed between the first and second plates, and first and second electrodes. The liquid crystal layer includes a plurality of liquid crystal molecules. The first plate includes a first aligner. The second plate includes a second aligner. A first alignment direction of the first aligner and a second alignment direction of the second aligner are substantially parallel to each other. The first and second electrodes extend to cross each other. The first and second electrodes are insulated from each other. The second electrode extends to cross the second alignment direction. An angle θP formed between a vertical axis of the second alignment direction and an extending direction of the second electrode is a value between 5° and 45°.

11 Claims, 12 Drawing Sheets

<Horizontal viewing mode>

(51) Int. Cl.
*G02B 27/22* (2018.01)
*G02F 1/29* (2006.01)

(56) References Cited

U.S. PATENT DOCUMENTS

| | | | | |
|---|---|---|---|---|
| 2006/0082702 | A1* | 4/2006 | Jacobs | G02B 5/3083 349/96 |
| 2008/0192343 | A1* | 8/2008 | Miyawaki | G02B 27/2221 359/462 |
| 2008/0291375 | A1* | 11/2008 | Asao | G02F 1/133514 349/106 |
| 2012/0300144 | A1* | 11/2012 | Lee | G02F 1/139 349/33 |

* cited by examiner

<Horizontal viewing mode>

<Vertical viewing mode>

OPTICAL MODULATION DEVICE INCLUDING LIQUID CRYSTALS, A DRIVING METHOD THEREOF, AND AN OPTICAL DISPLAY DEVICE USING THE SAME

CROSS-REFERENCE TO RELATED APPLICATION

This application claims priority under 35 U.S.C. § 119 to Korean Patent Application No. 10-2015-0004342, filed on Jan. 12, 2015 in the Korean Intellectual Property Office, the disclosure of which is incorporated by reference herein in its entirety.

TECHNICAL FIELD

The present invention relates to an optical modulation device, a driving method thereof, and an optical display device using the same, and more particularly, to an optical modulation device including liquid crystals, a driving method thereof, and an optical display device using the same.

DISCUSSION OF THE RELATED ART

An optical modulation device may be employed to modulate characteristics of light in an optical display device.

The optical modulation device may divide an image to transmit to different viewpoints such that a viewer may perceive the image as a stereoscopic image.

The optical modulation device may include a lens, a prism, etc. to alter a path of light of the image of the display device and direct the light to a desired viewpoint.

The path of light may be controlled using diffraction of the light due to phase-modulation of the light in the optical modulation device.

SUMMARY

According to an exemplary embodiment of the present invention, an optical modulation device is provided. The optical modulation device includes first and second plates facing each other, a liquid crystal layer interposed between the first and second plates, and first and second electrodes. The liquid crystal layer includes a plurality of liquid crystal molecules. The first plate includes a first aligner. The second plate includes a second aligner. A first alignment direction of the first aligner and a second alignment direction of the second aligner are substantially parallel to each other. The first and second electrodes extend to cross each other. The first and second electrodes are insulated from each other. The second electrode extends to cross the second alignment direction. An angle $\theta_P$ formed between a vertical axis of the second alignment direction and an extending direction of the second electrode is a value between 5° and 45°.

A difference $\theta_{UL}$ between an azimuthal angle of the first alignment direction of the first aligner and an azimuthal angle of the second alignment direction of the second aligner may be a value between −4° to +4°.

An angle $\theta_L$ formed between the first alignment direction and an extending direction of the first electrode may be a value between −1° to +1°.

When an electric field is generated in the liquid crystal layer, the liquid crystal molecules may be tilted to be substantially parallel with a surface of the first plate or the second plate to form an in-plane alignment, and long axes of the liquid crystal molecules may be rotated in-plane.

The first electrode may be formed in the first plate and the second electrode may be formed in the second plate. A first voltage may be applied to the first electrode and a common voltage may be applied to the second electrode in a first three-dimensional (3D) viewing mode. The common voltage may be applied to the first electrode and the first voltage may be applied to the second electrode in a second 3D viewing mode.

The first electrode may be formed in the first plate and the second electrode may be formed in the second plate. The first plate may further include a first common electrode that is insulated from the first electrode. The second plate may further include a second common electrode that is insulated from the second electrode. A first voltage may be applied to the first electrode and a common voltage may be applied to the second common electrode in a first three-dimensional (3D) viewing mode. The common voltage may be applied to the first common electrode and the first voltage may be applied to the second electrode in a second 3D viewing mode.

One of the first plate or the second plate may include the first and second electrodes, and another one of the first plate or the second plate may further include a common electrode. A first voltage may be applied to the first electrode and a common voltage may be applied to the common electrode in a first three-dimensional (3D) viewing mode. The first voltage may be applied to the second electrode and a common voltage may be applied to the common electrode in a second 3D viewing mode.

According to an exemplary embodiment of the present invention, an optical modulation device is provided. The optical modulation device includes first and second plates facing each other, a liquid crystal layer interposed between the first and second plates, and first and second electrodes. The liquid crystal layer includes a plurality of liquid crystal molecules. The first plate includes a first aligner. The second plate includes a second aligner. A first alignment direction of the first aligner and a second alignment direction of the second aligner are substantially parallel to each other. The first and second electrodes extend to cross each other. The first and second electrodes are insulated from each other. The second electrode extends to cross the second alignment direction. An angle θ formed between a vertical axis of the second alignment direction and an extending direction of the second electrode is a value between 5° and 45°. A first voltage may be applied to one of the first electrode or the second electrode according to a first three-dimensional (3D) viewing mode or a second 3D viewing mode. The first voltage is greater than a reference voltage.

A difference $\theta_{UL}$ between an azimuthal angle of the first alignment direction of the first aligner and an azimuthal angle of in the second alignment direction of the second aligner may be a value between −4° to +4°.

An angle $\theta_L$ formed between the first alignment direction and an extending direction of the first electrode may be a value between −1° to +1°.

The first voltage may be applied such that the liquid crystal molecules are tilted to be substantially parallel with a surface of the first plate or the second plate to form an in-plane alignment and long axes of the liquid crystal molecules are rotated in-plane.

The first voltage may be applied to the first electrode and a common voltage may be applied to the second electrode in the first 3D viewing mode. The common voltage may be applied to the second electrode and the first voltage may be applied to the first electrode in the second 3D viewing mode.

The first electrode may be formed in the first plate and the second electrode may be formed in the second plate. The first plate may further include a first common electrode that is insulated from the first electrode. The second plate may further include a second common electrode that is insulated from the second electrode. The first voltage may be applied to the first electrode and a common voltage may be applied to the second common electrode in the first 3D viewing mode. The common voltage may be applied to the first common electrode and the first voltage may be applied to the second electrode in the second 3D viewing mode.

One of the first plate or the second plate may include the first and second electrodes, and another one of the first plate or the second plate may further include a common electrode. The first voltage may be applied to the first electrode and a common voltage may be applied to the common electrode in the first 3D viewing mode. The first voltage may be applied to the second electrode and a common voltage may be applied to the common electrode in the second 3D viewing mode.

The first 3D viewing mode may be a 3D horizontal viewing mode, and the second 3D viewing mode may be a 3D vertical viewing mode.

According to an exemplary embodiment of the present invention, an optical display device is provided. The optical display device includes the optical modulation device described above. According to an exemplary embodiment of the present invention, a driving method of an optical modulation device is provided. The method includes applying a first voltage to a first electrode extending in a first direction in a first three-dimensional (3D) viewing mode, applying a common voltage to a second electrode extending in a second direction substantially perpendicular to the first direction in the first 3D viewing mode, applying a second voltage to the second electrode in a second 3D viewing mode, and applying the common voltage to the first electrode in the second 3D viewing mode. A liquid crystal layer including a plurality of liquid crystal molecules is interposed between the first electrode and the second electrode. A difference between the first voltage and the common voltage is greater than a reference value, and a difference between the second voltage and the common voltage is greater than the reference value. An angle $\theta_P$ formed between a vertical axis of a second alignment direction of a second aligner in the optical modulation device and the second direction is a value between 5° and 45°.

An angle $\theta_L$ formed between the first alignment direction and the first direction may be a value between −1° to +1°.

The first 3D viewing mode may be a 3D horizontal viewing mode, and the second 3D viewing mode may be a 3D vertical viewing mode.

DETAILED DESCRIPTION OF THE EMBODIMENTS

Figure 1:
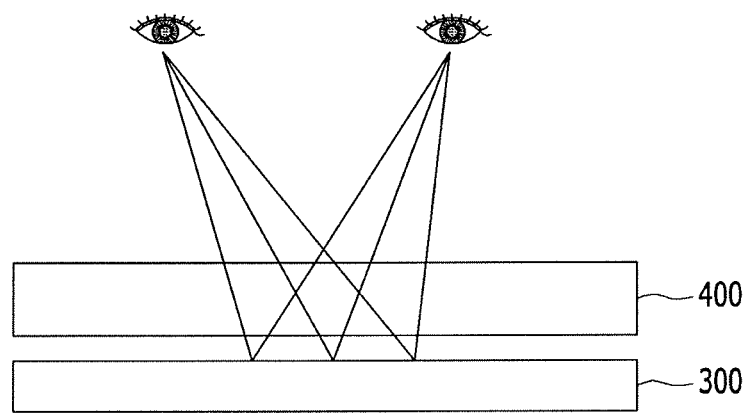
FIG. 1 is a diagram illustrating a structure of an optical display device according to an exemplary embodiment of the present invention and a method of generating a 2D image.

The present invention will be described more fully hereinafter with reference to the accompanying drawings, in which exemplary embodiments of the present invention are shown. However, the present invention may be embodied in various different forms without departing from the spirit or scope of the present invention.

In the drawings, the thickness of layers, films, panels, regions, etc. may be exaggerated for clarity.

Like reference numerals may designate like elements throughout the specification and drawings. It will be understood that when an element such as a layer, film, region, or substrate is referred to as being "on" another element, it can be directly on the other element or intervening elements may also be present.

An optical modulation device according to an exemplary embodiment of the present invention will now be described with reference to FIGS. 1 to 3.

FIG. 1 illustrates a case in which a display panel 300 and an optical modulation device 400 are operated in a two-dimensional (2D) mode.

In the 2D mode, substantially the same image reaches a left eye and a right eye to be perceived as a 2D image.

Figure 2:
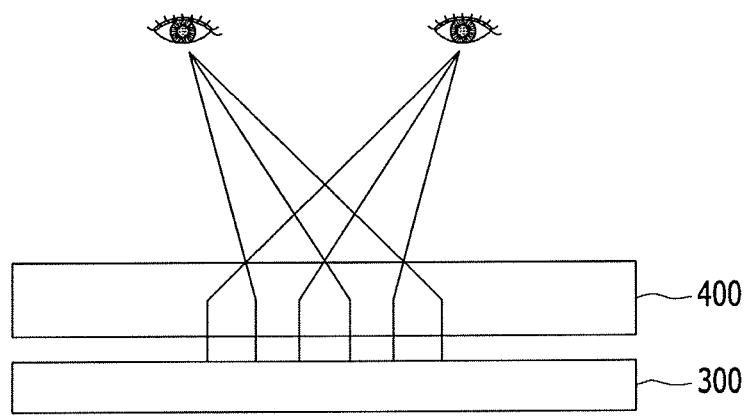
FIG. 2 is a diagram illustrating a structure of an optical display device according to an exemplary embodiment of the present invention and a method of generating a 3D image.

FIG. 2 illustrates a case in which the display panel 300 and the optical modulation device 400 are operated in a three-dimensional (3D) mode.

The optical modulation device 400 divides an image of the display panel 300 into viewing zones for the left and right eyes and refracts the image such that a 3D image is recognized.

Figure 3:
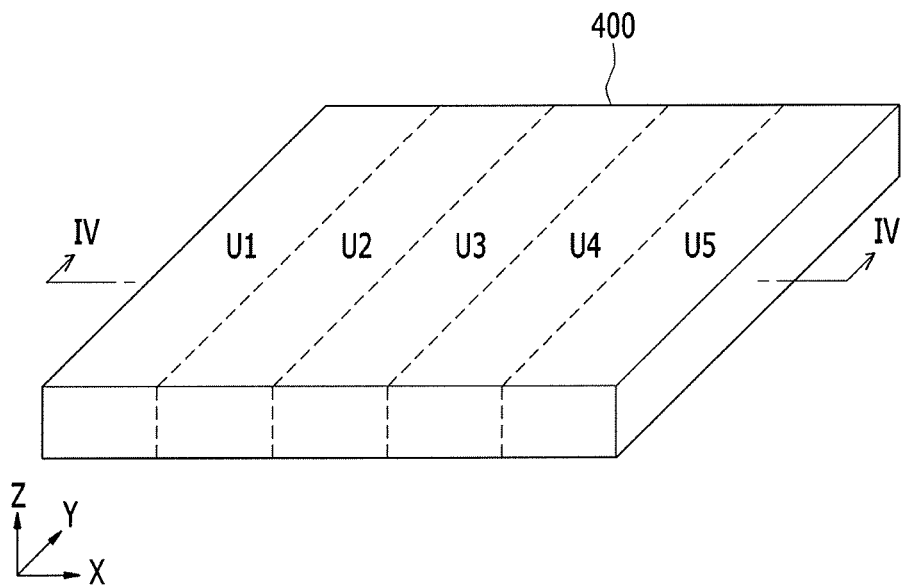
FIG. 3 is a perspective view of an optical modulation device included in an optical display device according to an exemplary embodiment of the present invention.

FIG. 3 is a perspective view of an optical modulation device included in an optical display device according to an exemplary embodiment of the present invention.

Figure 4:
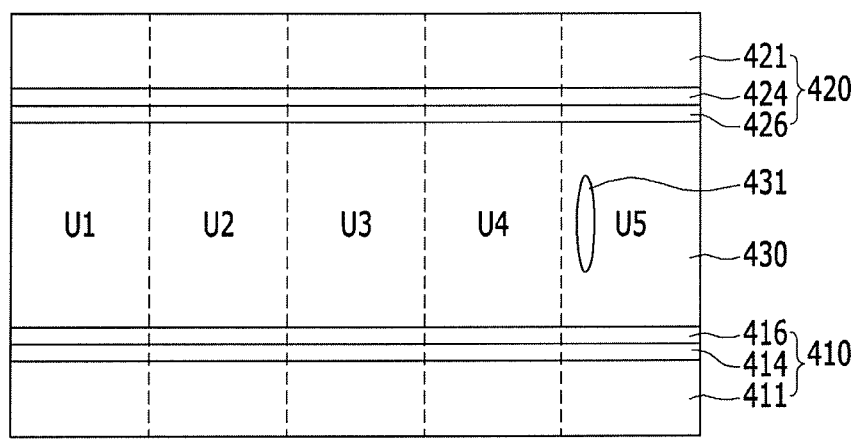
FIG. 4 is a cross-sectional view of a liquid crystal lens panel of FIG. 3, taken along a line IV-IV of FIG. 3.

FIG. 4 is a cross-sectional view of a liquid crystal lens panel of FIG. 3, taken along a line IV-IV of FIG. 3.

Referring to FIGS. 3 and 4, the optical modulation device 400 includes a plurality of unit elements U1 to U5 that are sequentially disposed in an X-axis direction.

In the drawings, five unit elements U1 to U5 are illustrated as an example, however the present invention is not limited thereto, and the number of unit elements may be changed in various ways.

Each unit element covers N viewpoints of the display panel 300 (where N is a natural number).

Each of the N viewpoints corresponds to one pixel.

For example, each unit element may cover nine viewpoints.

Each unit element may function as a lens.

The optical modulation device 400 includes first and second plates 410 and 420 facing each other, and a liquid crystal layer 430 interposed between the two plates 410 and 420.

The first plate 410 includes a first base substrate 411, a first electrode 414, and a first alignment layer 416 that are formed on the first base substrate 411. The first base substrate 411 may be formed of glass, plastic, etc. The second plate 420 includes a second base substrate 421, a second electrode 424, and a second alignment layer 426 that are formed on the second base substrate 421.

The first and second electrodes 414 and 424 may be formed of a transparent conductive material such as indium tin oxide (ITO), indium zinc oxide (IZO), etc.

The liquid crystal layer 430 may include vertically aligned liquid crystal molecules.

The first and second electrodes 414 and 424 control arrangements of liquid crystal molecules 431 of the liquid crystal layer 430 by generating an electric field in the liquid crystal layer 430 based on voltages applied thereto.

The optical modulation device 400 is operated in the 2D or 3D mode according to the voltages applied to the first and second electrodes 414 and 424.

For example, the optical modulation device 400 is operated in the 2D mode when no voltage is applied to the first and second electrodes 414 and 424 or when a common voltage Vcom is applied thereto, and the optical modulation device 400 is operated in the 3D mode when a lens voltage is applied to either one of the first and second electrodes 414 and 424 or when a common voltage is applied to another one of the first and second electrodes 414 and 424.

Figure 5:
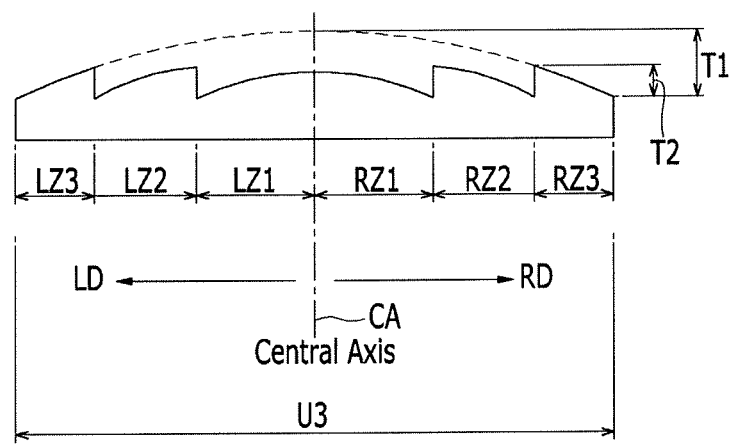
FIG. 5 is a diagram illustrating a shape of a unit element illustrated in FIG. 3 and phase delays in the unit element.

FIG. 5 is a diagram illustrating a shape of a unit element U3 illustrated in FIG. 3 and phase delays in the unit element U3.

Since shapes of the unit elements U1 to U5 are identical to each other, only the single unit element U3 will be described in FIG. 5 and descriptions of the unit elements U1, U2, U4, and U5 will be omitted.

The single unit element U3 may produce the same phase change as a Fresnel lens when the liquid crystal layer 430 is tilted.

For example, an unit element U forms the Fresnel lens by setting discrete points of a phase as a boundary when an ideal phase delay surface to be formed is divided by integer multiples of 2 times pi ($2\pi$) radians, which may be referred to as wrapping.

For example, the Fresnel lens is a lens that adopts only a phase delay surface of a convex lens having a first thickness T1 to have a second thickness T2 smaller than the first thickness T1.

Accordingly, when the optical modulation device 400 is operated as the Fresnel lens, a cell gap may be reduced to 1/K of that when the optical modulation device 400 is operated as the convex lens.

"K" is a natural number corresponding to n/2 radians when the number of circular arcs included in the Fresnel lens is n.

By dividing the ideal phase delay surface, each unit element U3 is split into a plurality of prism areas RZ1, RZ2, RZ3, LZ1, LZ2, and LZ3.

Right prism areas RZ1, RZ2, and RZ3 are formed to be symmetrical to left prism areas LZ3, LZ2, and LZ1 with respect to a central axis CA.

The plurality of prism areas RZ1, RZ2, RZ3, LZ1, LZ2, and LZ3 may have one of a plurality of concentric circles each having a curvature, and have smaller intervals therebetween as they get further away from the central axis CA.

For example, as shown in FIG. 5, widths (hereinafter referred to as pitches) of the right prism areas RZ1, RZ2, and RZ3 become smaller in a right direction RD with respect to the central axis CA, pitches of the left prism areas LZ1, LZ2, and LZ3 become smaller in a left direction LD with respect to the central axis CA. The left direction LD is opposite to the right direction RD.

In FIG. 5, three prism areas are illustrated in each of the left and right regions with respect to the central axis CA as an example, however the present invention is not limited thereto, and the number of prisms may be changed according to various factors such as resolution, or the like.

As shown in FIG. 5, each of the prism areas RZ1, RZ2, RZ3, LZ1, LZ2, and LZ3 has a shape in which the phase delay increases as a position thereof is closer to the central axis CA.

By having such a shape, each of the unit elements U1 to U5 may refract light passing through the unit elements U1 to U5 such that the light is concentrated on a focal point through diffraction, destructive interference, and constructive interference.

An optical modulation device 400 configured to operate as a Fresnel zone plate according to an exemplary embodiment of the present invention will now be described with reference to FIGS. 6 and 7.

The optical modulation device 400 may be referred to as a switchable zone plate.

Figure 6:
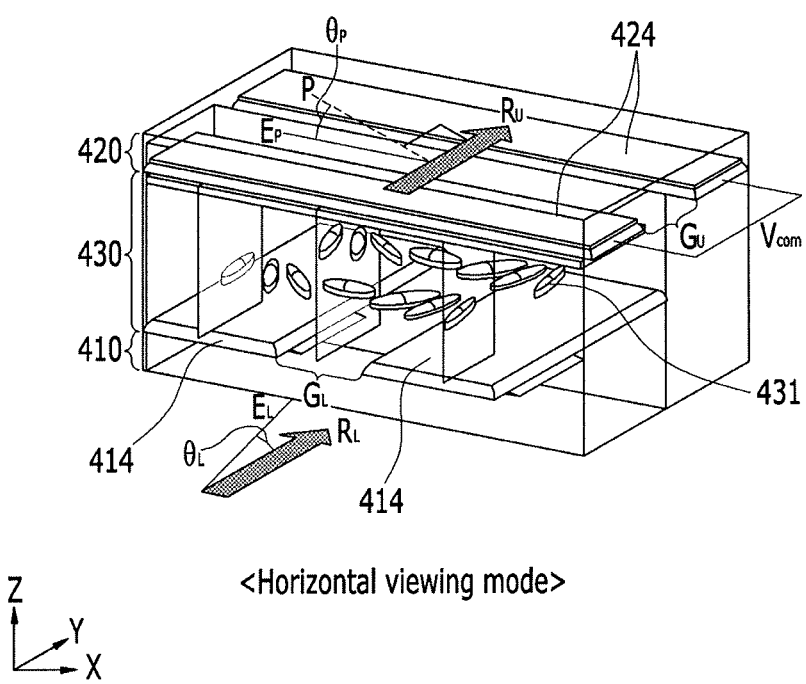
FIG. 6 is a perspective view of an optical modulation device according to an exemplary embodiment of the present invention when the optical modulation device is driven in a horizontal viewing mode.
Figure 7:
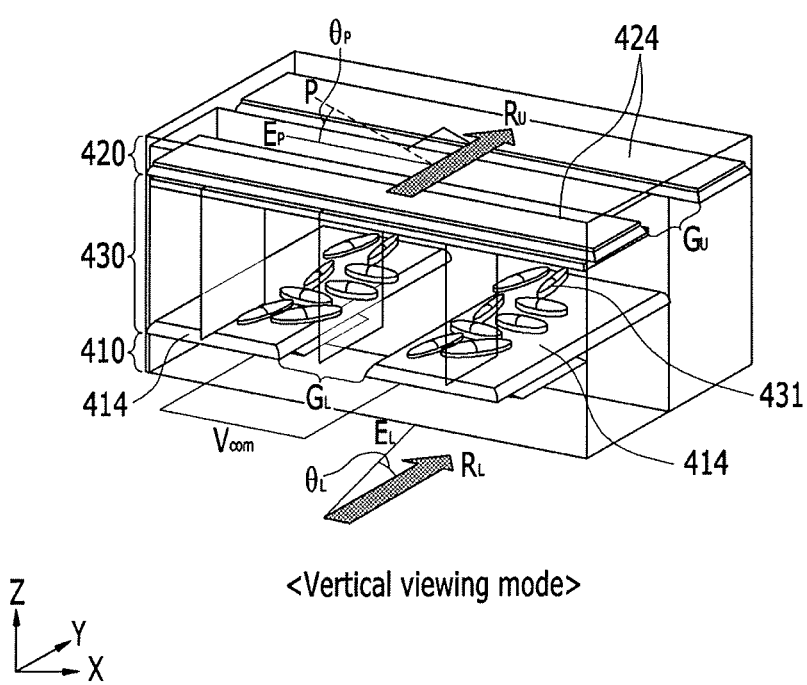
FIG. 7 is a perspective view of an optical modulation device according to an exemplary embodiment of the present invention when the optical modulation device is driven in a vertical viewing mode.

FIG. 6 is a perspective view of an optical modulation device according to an exemplary embodiment of the present invention when the optical modulation device is driven in a horizontal viewing mode, and FIG. 7 is a perspective view of an optical modulation device according to an exemplary embodiment of the present invention when the optical modulation device is driven in a vertical viewing mode.

In FIGS. 6 and 7, for ease of description, an electrode structure and alignment directions of aligners are only illustrated to describe the optical modulation device according to an exemplary embodiment of the present invention.

Referring to FIGS. 6 and 7, the optical modulation device 400 includes a liquid crystal layer 430 between first and second plates 410 and 420 that face each other.

A plurality of first electrodes 414 is disposed on the first plate 410, and a plurality of second electrodes 424 is disposed on the second plate 420.

The first and second electrodes 414 and 424 include a conductive material, and may include a transparent conductive material such as ITO, IZO, etc. or a metal.

The first and second electrodes 414 and 424 may be formed such that they extend to be substantially perpendicular to each other.

For example, the plurality of first electrodes 414 may be arranged in the X-axis direction, and each of the first electrodes 414 may extend in a direction (e.g., the Y-axis direction) substantially perpendicular to the direction (e.g., the X-axis direction) in which the first electrodes 414 are arranged.

The plurality of second electrodes 424 may be arranged in the Y-axis direction, and each of the second electrodes 424 may extend in a direction (e.g., the X-axis direction) substantially perpendicular to the direction (e.g., the Y-axis direction) in the second electrodes 424 are arranged.

A first width of a space $G_L$ between adjacent first electrodes 414 and a second width of a space $G_U$ between adjacent second electrodes 424 may be adjusted in various ways depending on design specifications of the optical modulation device.

A ratio of a width of the first electrode 414 to the first width of the space $G_L$ adjacent to the first electrode 414 and a ratio of a width of the second electrode 424 to the second width of the space $G_U$ adjacent to the second electrode 424 may be approximately N:1 (where N is a real number of 1 or more). For example, the width of the first electrode 414 may be greater than the first width of the space $G_L$ adjacent to the first electrode 414, and the width of the second electrode 424 may be greater than the second width of the space $G_U$ adjacent to the second electrode 424.

The liquid crystal layer 430 includes a plurality of liquid crystal molecules 431.

The liquid crystal molecules 431 have negative dielectric anisotropy, and may be arranged transverse to a direction of an electric field that is generated in the liquid crystal layer 430.

The liquid crystal molecules 431 are aligned in a direction substantially perpendicular to the second plate 420 and the first plate 410 when no electric field is generated in the liquid crystal layer 430, and may be pre-tilted in a specific direction.

The liquid crystal molecules 431 may be nematic liquid crystal molecules.

For light of a specific wavelength (λ), a height d of a cell gap of the liquid crystal layer 430 may approximately satisfy Equation 1.

According to Equation 1, the optical modulation device according to an exemplary embodiment of the present invention may substantially function as a half-wave plate, and may be used as a diffraction grating, a lens, etc.

$$\frac{\lambda}{2} \times 1.3 \geq \Delta nd \geq \frac{\lambda}{2} \qquad \text{[Equation 1]}$$

In Equation 1 above, Δnd is a phase delay of light that passes through the liquid crystal layer 430.

A first aligner (e.g., 416 of FIG. 3) is disposed at an inner surface of the first plate 410 and a second aligner (e.g., 426 of FIG. 3) is disposed at an inner surface of the second plate 420, and the first and second aligners may be vertical alignment layers and may control alignments of the liquid crystal molecules 431 using various methods such as a rubbing process, a photo-alignment process, etc. to determine a pretilt direction of the liquid crystal molecules 431 that are adjacent to the first and second plates 410 and 420.

When the rubbing process is used, the vertical alignment layer (e.g., the first aligner or the second aligner) may be an organic vertical alignment layer.

When the photo-alignment process is used, a photo-polymerizing material may be formed by coating the inner surfaces of the first and second plates 410 and 420 with an aligning material including a photoresist material and then irradiating light such as ultraviolet rays, or the like, thereto.

A first alignment direction $R_L$ of the first aligner (e.g., 416 of FIG. 3) is substantially parallel to a second alignment direction and $R_U$ of the second aligner (e.g., 426 of FIG. 3). When misalignment margins of the first and second plates 410 and 420 are considered, a difference $\theta_n$ between an azimuthal angle of the first alignment direction $R_L$ of the first aligner of the first plate 410 and an azimuthal angle of the second alignment direction $R_U$ the second aligner of the second plate 420 may be approximately in a range of −4° and +4°, but is not limited thereto. For example, this may be interpreted as being "substantially parallel".

Referring to FIGS. 6 and 7, the optical modulation device according to an exemplary embodiment of the present invention includes the first and second electrodes 414 and 424 that extend to cross the first and second alignment directions $R_U$ and $R_L$ that are parallel to each other.

The second electrode 424 extends to cross the first alignment direction $R_L$ such that the first alignment direction $R_L$ and the extending direction of the second electrode 424 are not perpendicular to each other and maintain a predetermined angle (e.g., an angle less than 90°) therebetween.

For example, an angle $\theta_P$ formed between a vertical axis P of the second alignment direction $R_U$ of the second aligner disposed at the inner surface of the second plate 420 and an extending direction Ep of the second electrode 424 may be approximately 5° to 45°.

When the angle $\theta_P$ formed between the vertical axis P of the second alignment direction $R_U$ of the second aligner in the second alignment direction $R_U$ and the extending direction Ep of the second electrode 424 is less than, for example, 4°, a large amount of texture may be generated since control over the liquid crystal molecules 431 is not guaranteed when an electric field is applied to the liquid crystal molecules 431.

In addition, the first alignment direction $R_L$ of the first aligner disposed at the inner surface of the first plate 410 and the first electrode 414 may extend in substantially parallel with each other.

"Substantially in parallel" may be understood to mean that an angle $\theta_L$ formed between the first alignment direction $R_L$ and an extending direction $E_L$ of the first electrode 414 is approximately a value between −1° and +1°.

The horizontal viewing mode and the vertical viewing mode will now be described with reference to FIGS. 6 and 7.

As illustrated in FIG. 6, in the horizontal viewing mode, a common voltage is applied to the second electrode 424 that extends to cross the second alignment direction $R_U$, and a set of driving voltages (e.g., a lens voltage) for forming lens shapes may be applied to the first electrode 414 that extends to be substantially parallel to the first alignment direction $R_L$.

For example, in the horizontal viewing mode, the second electrode 424 functions as a common electrode and the first electrode 414 functions as a lens electrode.

In addition, when the horizontal viewing mode is switched to the vertical viewing mode, as illustrated in FIG. 7, the common voltage may be applied to the first electrode 414 that extends to be substantially parallel to the first alignment direction $R_L$, and the lens voltage for forming the lens shapes may be applied to the second electrode 424 that extends to cross the second alignment direction $R_U$.

For example, in the vertical viewing mode, the first electrode 414 functions as the common electrode, and the second electrode 424 functions as the lens electrode.

When no voltage is applied to or no voltage difference is generated between the first electrode 414 of the first plate 410 and the second electrode 424 of the second plate 420, no electric field is generated in the liquid crystal layer 430, and thus, the liquid crystal molecules 431 are arranged in an initial pretilt direction.

In this case, since liquid crystal molecules 431 adjacent to the first and second plates 410 and 420 are initially aligned according to the alignment directions $R_U$ and $R_L$, a pretilt direction of the liquid crystal molecules 431 adjacent to the first plate 410 is not parallel to a pretilt direction of the liquid crystal molecules 431 adjacent to the second plate 420, and they are opposite to each other.

For example, when viewed in a cross-section, the liquid crystal molecules 431 adjacent to the first plate 410 and the liquid crystal molecules 431 adjacent to the second plate 420 may be tilted such that they are substantially symmetrical to each other with respect to a horizontal center line that extends horizontally along a center of the liquid crystal layer 430.

For example, when the liquid crystal molecules 431 adjacent to the first plate 410 are tilted to the right, the liquid crystal molecules 431 adjacent to the second plate 420 may be tilted to the left.

For example, the liquid crystal molecules 431 may be tilted at an angle of approximately 5° to 45°.

Next, in a 3D horizontal viewing mode, the common voltage is applied to the second electrode 424 and the lens voltage for forming lens shapes is applied to the first electrode 414, as illustrated in FIG. 6, and a voltage difference exceeding a threshold voltage is applied between the first and second electrodes 414 and 424.

After the electric field is generated in the liquid crystal layer 430, the liquid crystal molecules 431 having negative dielectric anisotropy tend to tilt in a direction substantially perpendicular to a direction of the electric field.

Accordingly, as illustrated in FIG. 6, the liquid crystal molecules 431 are tilted to be substantially parallel to a surface of the first plate 410 or the second plate 420 to form an in-plane arrangement, and are arranged such that long axes of the liquid crystal molecules 431 are rotated in-plane.

The in-plane arrangement may be understood to mean an arrangement in which the long axes of the liquid crystal molecules 431 are arranged to be substantially parallel with the surface of the first plate 410 or the second plate 420, for example, an XY plane.

In this case, an in-plane rotation angle of the liquid crystal molecules 31, for example, the azimuthal angle, may be changed depending on the voltages applied to the first and second electrodes 414 and 424. For example, the rotation angle of the liquid crystal molecules 31 may be changed to a spiral shape depending on a location of the X-axis direction.

When an optical axis of the optical modulation device which acts as a half-wave plate is rotated in-plane by $\phi$, a phase of light passing through the half-wave plate is rotated by $2\phi$, and thus, a phase of the light outputted from a single unit area of the optical modulation device is changed from 0 to $2\pi$ radians along the X-axis direction. The single unit area of the optical modulation device may be a unit where the azimuthal angle of the long axes of the liquid crystal molecules 31 is changed by 180°.

The phase change may be repeated for every unit area, and thus, a diffraction grating, a prism, a lens, etc. that alters a direction of light, may be implemented by using the optical modulation device.

Next, when operated in a 3D vertical viewing mode by pivoting the display device, as illustrated in FIG. 7, the common voltage is applied to the first electrode 414 and the lens voltage for forming lens shapes is applied to the second electrode 424.

Figure 8:
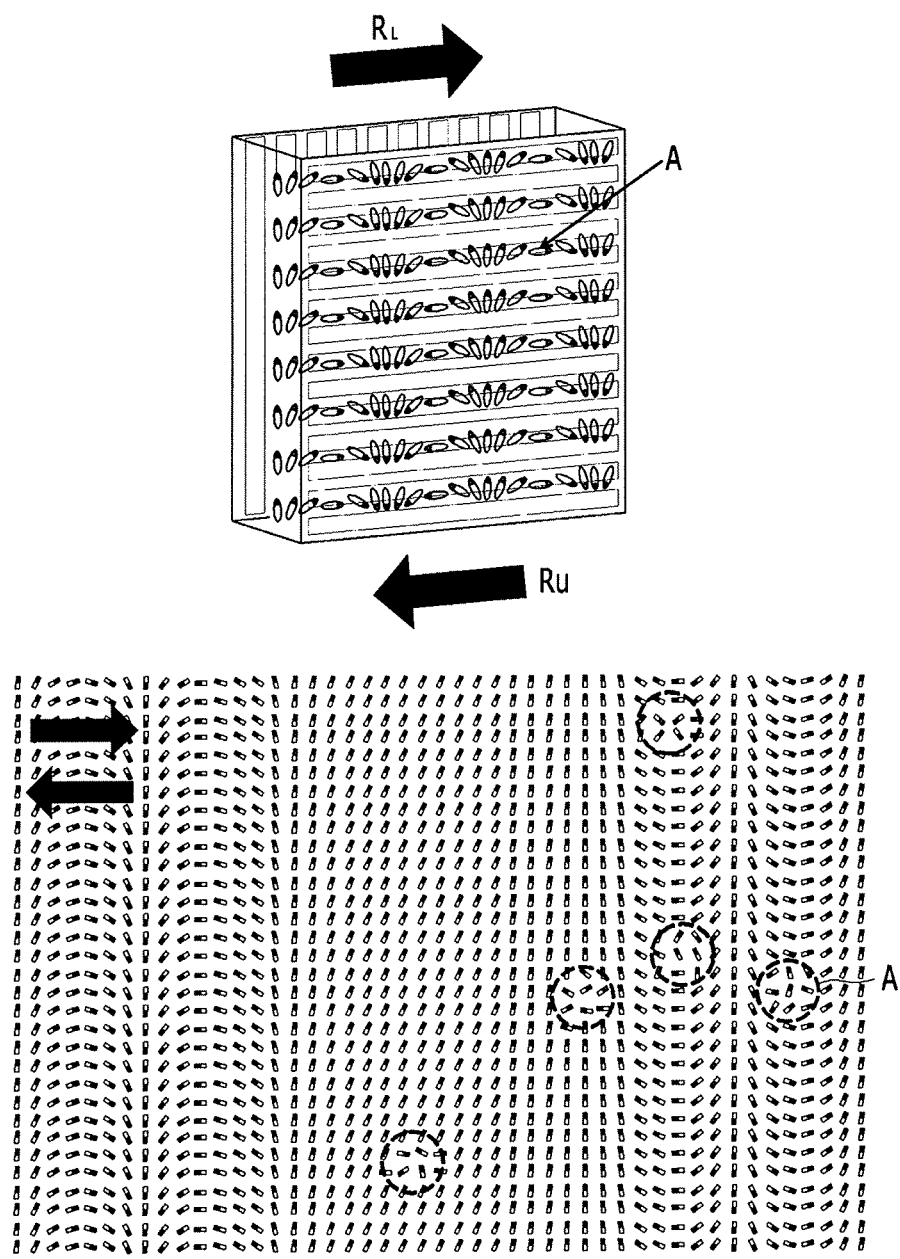
FIG. 8 is a cross-sectional view illustrating a case where a texture occurs when a rubbing direction and an extending direction of an electrode are perpendicular to each other according to an exemplary embodiment of the present invention.

When a second alignment direction $R_U$ of the second aligner and an extending direction Ep of the second electrode 424 are substantially perpendicular to each other, as illustrated in FIG. 8, since the liquid crystal molecules 431, which should lie down on the second electrode 424 in the extending direction Ep of the second electrode 424, have bi-directional orientations, for example, upward and downward orientations, the liquid crystal molecules 431 may randomly lie down such that spiral shapes may not be formed and thus, textures A may be generated and a desired lens form may not be achieved.

Figure 9:
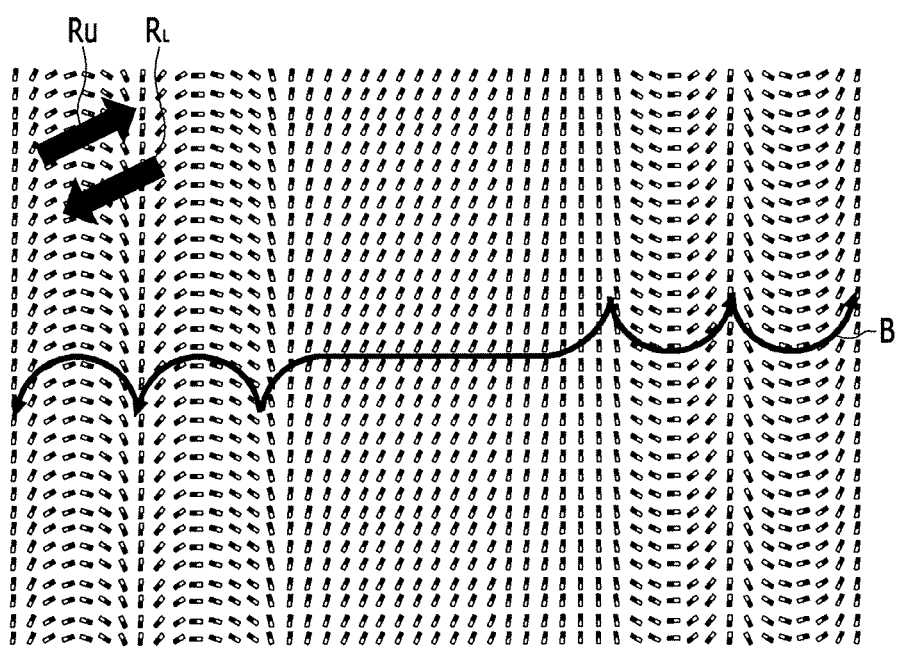
FIG. 9 is a cross-sectional view illustrating a case where spiral shapes are normally formed in an optical modulation device according to an exemplary embodiment of the present invention.

In addition, as illustrated in FIG. 9, in the optical modulation device according to an exemplary embodiments of the present invention, the spiral shapes B are normally formed to create a normal lens, since an angle $\theta_P$ formed between the vertical axis P of the second alignment direction $R_U$ of the second aligner and the extending direction Ep of the second electrode 424 is approximately 4° to 45° and the liquid crystal molecules 431 have a predetermined direction in which they should lie down.

As such, according to an exemplary embodiment of the present invention, since the first and second aligners disposed in the first and second plates 410 and 420 of the optical modulation device including the liquid crystal molecules are substantially parallel to each other and each of the alignment directions $R_L$ and $R_U$ of the aligners is fixed, an alignment process of the optical modulation device may be simplified and a complicated alignment process may be reduced.

Accordingly, in an optical modulation device according to an exemplary embodiment of the present invention and an optical display device including the optical modulation device, defects due to misalignment may be reduced.

Accordingly, an optical modulation device of a larger size may be easily manufactured.

In addition, regardless of the horizontal viewing mode and the vertical viewing mode, the in-plane rotation angle of the liquid crystal molecules 31 may be easily adjusted to modulate the phase of light and thus, pivoting between the horizontal viewing mode and the vertical viewing mode may be achieved.

Figure 10:
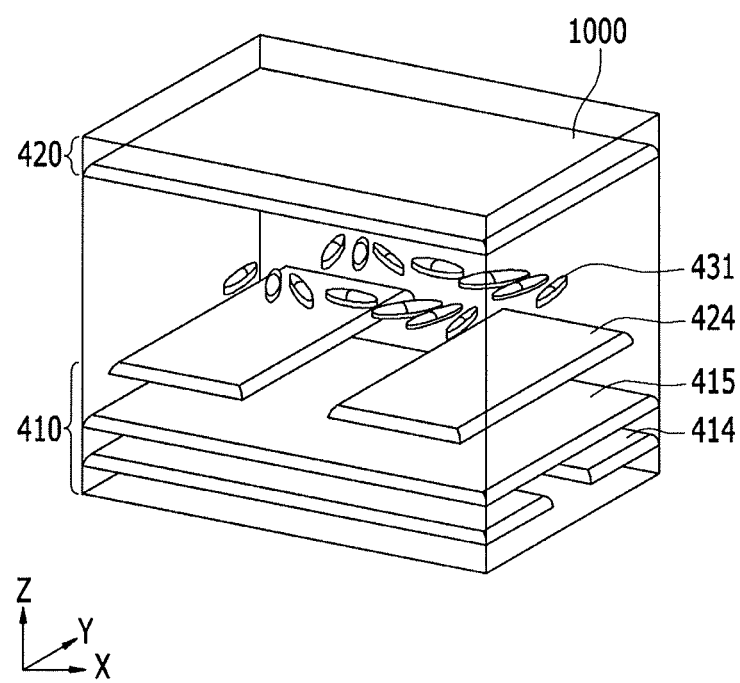
FIG. 10 is a perspective view of an optical modulation device according to an exemplary embodiment of the present invention.
Figure 11:
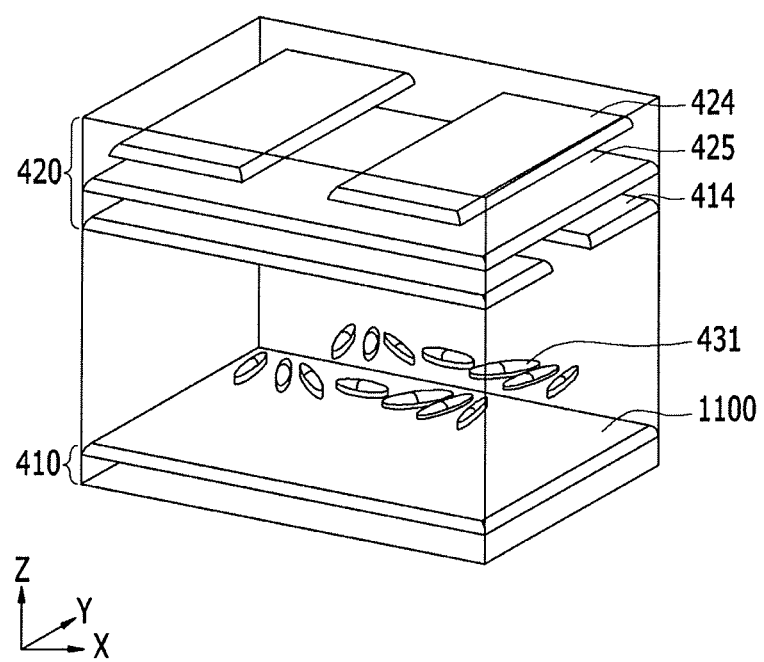
FIG. 11 is a perspective view of an optical modulation device according to an exemplary embodiment of the present invention.
Figure 12:
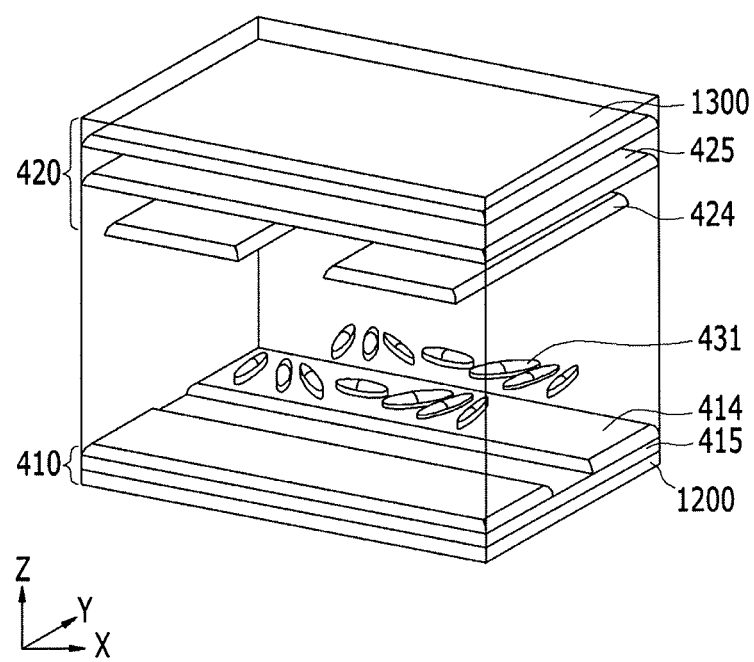
FIG. 12 is a perspective view of an optical modulation device according to an exemplary embodiment of the present invention.

FIG. 10 is a perspective view of an optical modulation device according to an exemplary embodiment of the present invention, FIG. 11 is a perspective view of an optical modulation device according to an exemplary embodiment of the present invention, and FIG. 12 is a perspective view of an optical modulation device according to an exemplary embodiment of the present invention.

Referring to FIG. 10, first and second electrodes 414 and 424 extending to cross each other are formed in a first plate 410 of the optical modulation device, and a second plate 420 of the optical modulation device includes a common electrode 1000.

The first and second electrodes 414 and 424 are insulated from each other when a first insulating layer 415 is interposed between the first and second electrodes 414 and 424.

Referring to FIG. 11, first and second electrodes 414 and 424 are formed in a second plate 420 of the optical modulation device, and a first plate 410 of the optical modulation device includes a common electrode 1100.

The first and second electrodes 414 and 424 are insulated from each other when an insulating layer 425 is interposed between the first and second electrodes 414 and 424.

Referring to FIG. 12, the first and second plates 410 and 420 of the optical modulation device of FIG. 6 further include first and second common electrodes 1200 and 1300, respectively. The first and second common electrodes 1200 and 1300 are specialized, respectively, in a horizontal viewing mode and a vertical viewing mode.

The first electrode 414 and the first common electrode 1200 are insulated from each other when a first insulating layer 415 is interposed therebetween. The second electrode 424 and the second common electrode 1300 are insulated from each other when a second insulating layer 425 is interposed therebetween.

In FIGS. 10 to 12, the same conditions, where the angle $\theta_P$ formed between the vertical axis P of the second alignment direction $R_U$ and the extending direction Ep of the second electrode 424 is approximately 5° to 45°, the difference $\theta_n$ between the azimuthal angle of the first aligner and the azimuthal angle of the second aligner is less than about ±4°, and the angle $\theta_L$ formed between the first alignment direction $R_L$ and the extending direction of the first electrode 414 substantially parallel thereto is less than about ±1°, may be applied.

According to an exemplary embodiment the present invention, an optical modulation device including liquid crystals that is capable of suppressing a texture and displaying a horizontal image and a vertical image may be provided by allowing an in-plane rotation angles of liquid crystal molecules to be easily adjusted to modulate a phase of light and enhancing control of the liquid crystal molecules regardless of a horizontal viewing mode or a vertical viewing mode.

According to an exemplary embodiment the present invention, a driving method of the optical modulation device that is capable of displaying both a horizontal image and a vertical image may be provided.

According to an exemplary embodiment the present invention, an optical display device using an optical modulation device that is capable of displaying an image suitable for both a horizontal viewing mode and a vertical viewing mode may be provided.

While the present invention has been particularly shown and described with reference to exemplary embodiments thereof, it will be understood that the present invention is not limited to the disclosed embodiments thereof.

What is claimed is:

1. An optical modulation device comprising:
first and second plates facing each other;
a liquid crystal layer interposed between the first and second plates, the liquid crystal layer including a plurality of liquid crystal molecules; and
first and second electrodes, wherein
the first plate includes a first aligner, the second plate includes a second aligner, a first alignment direction of the first aligner and a second alignment direction of the second aligner are substantially parallel to each other,
the first and second electrodes extend to cross each other, and the first and second electrodes are insulated from each other,
wherein the second electrode extends to cross the second alignment direction, an angle θp formed between a vertical axis of the second alignment direction and an extending direction of the second electrode is a value between 5° and 45°, and
wherein the first electrode is formed in the first plate and the second electrode is formed in die second plate,
a first voltage is applied to the first electrode and a common voltage is applied to the second electrode in a first three-dimensional (3D) viewing mode, and
the common voltage is applied to the first electrode and the first voltage is applied to the second electrode in a second 3D viewing mode.

2. The optical modulation device of claim 1, wherein a difference $\theta_{UL}$ between an azimuthal angle of the first alignment direction of the first aligner and an azimuthal angle of the second alignment direction of the second aligner is a value between −4° to +4.

3. The optical modulation device of claim 1, wherein an angle $\theta_L$ formed between the first alignment direction and an extending direction of the first electrode is a value between −1° to +1°.

4. The optical modulation device of claim 1, wherein, when an electric field is generated in the liquid crystal layer, the liquid crystal molecules are tilted to be substantially parallel with a surface of the first plate or the second plate to form an in-plane alignment, and long axes of the liquid crystal molecules are rotated in-plane.

5. An optical display device Including the optical modulation device of claim 1.

6. The optical modulation device of claim 1, wherein the first 3D viewing mode is a 3D horizontal viewing mode, and
the second 3D viewing mode is a 3D vertical viewing mode.

7. An optical modulation device comprising:
first and second plates facing each other;
a liquid crystal layer interposed between the first and second plates, the liquid crystal layer including a plurality of liquid crystal modules; and
first and second electrode, wherein
the first plate includes a first aligner, the second plate includes a second aligner, a first alignment direction of the first aligner and a second alignment direction of the second aligner are substantially parallel to each other,
the first and second electrodes extend to cross each other, and the first and second electrodes are insulated from each other,
wherein the second electrode extends to cross the second alignment direction,
an angle θp formed between a vertical axis of the second alignment direction and an extending direction of the second electrode is a value between 5° and 45°,
wherein the first electrode is formed in the first plate and the second electrode is formed in the second plate,
the first plate further includes a first common electrode that is insulated from the first electrode,
the second plate further includes a second common electrode that is insulated from the second electrode,
a first voltage is applied to the first electrode and a common voltage is applied to the second common electrode in a first three-dimensional (3D) viewing mode, and
the common voltage is applied to the first common electrode and the first voltage Is applied to the second electrode in a second 3D viewing mode.

8. An optical modulation device comprising:
first and second plates facing each other;

a liquid crystal layer interposed between the first and second plates, the liquid crystal layer including a plurality of liquid crystal modules; and first and second electrode, wherein the first plate includes a first aligner, the second plate includes a second aligner, a first alignment direction of the first aligner and a second alignment direction of the second aligner are substantially parallel to each other, the first and second electrodes extend to cross each other, and the first and second electrodes are insulated from each other, wherein the second electrode extends to cross the second alignment direction, an angle θp formed between a vertical axis of the second alignment direction and an extending direction of the second electrode is a value between 5° and 45°, wherein one of the first plate or the second plate includes the first and second electrodes, another one of the first plate or the second plate further includes a common electrode, a first voltage is applied to the first electrode and a common voltage is applied to the common electrode in a first three-dimensional (3D) viewing mode, and the first voltage is applied to the second electrode and the common voltage is applied to the common electrode in a second 3D viewing mode.

9. A driving method of an optical modulation device, comprising:

applying a first voltage to a first electrode extending in a first direction in a first three-dimensional (3D) viewing mode;

applying a common voltage to a second electrode extending in a second direction substantially perpendicular to the first direction in the first 3D viewing mode;

applying a second voltage to the second electrode in a second 3D viewing mode;

and applying the common voltage to the first electrode in the second 3 D viewing mode, wherein a liquid crystal layer including a plurality of liquid crystal molecules is interposed between the first electrode and the second electrode, wherein a difference between the first voltage and the common voltage is greater than a reference value, a difference between the second voltage and the common voltage is greater than the reference value, wherein an angle θp formed between a vertical axis of a second alignment direction of a second aligner in the optical modulation device and the second direction is a value between 5° and 45°.

10. The driving method of claim 9, wherein an angle θL formed between the first alignment direction and the first direction is a value between −1° to +1°.

11. The driving method of claim 9, wherein the first 3D viewing mode is a 3D horizontal viewing mode, and the second 3D viewing mode is a 3D vertical viewing mode.

* * * * *